June 26, 1928.
C. L. FORTIER
1,675,213
ACTUATING MECHANISM FOR SELECTIVE CONTROL THERMOSTAT SYSTEMS
Filed July 21, 1926
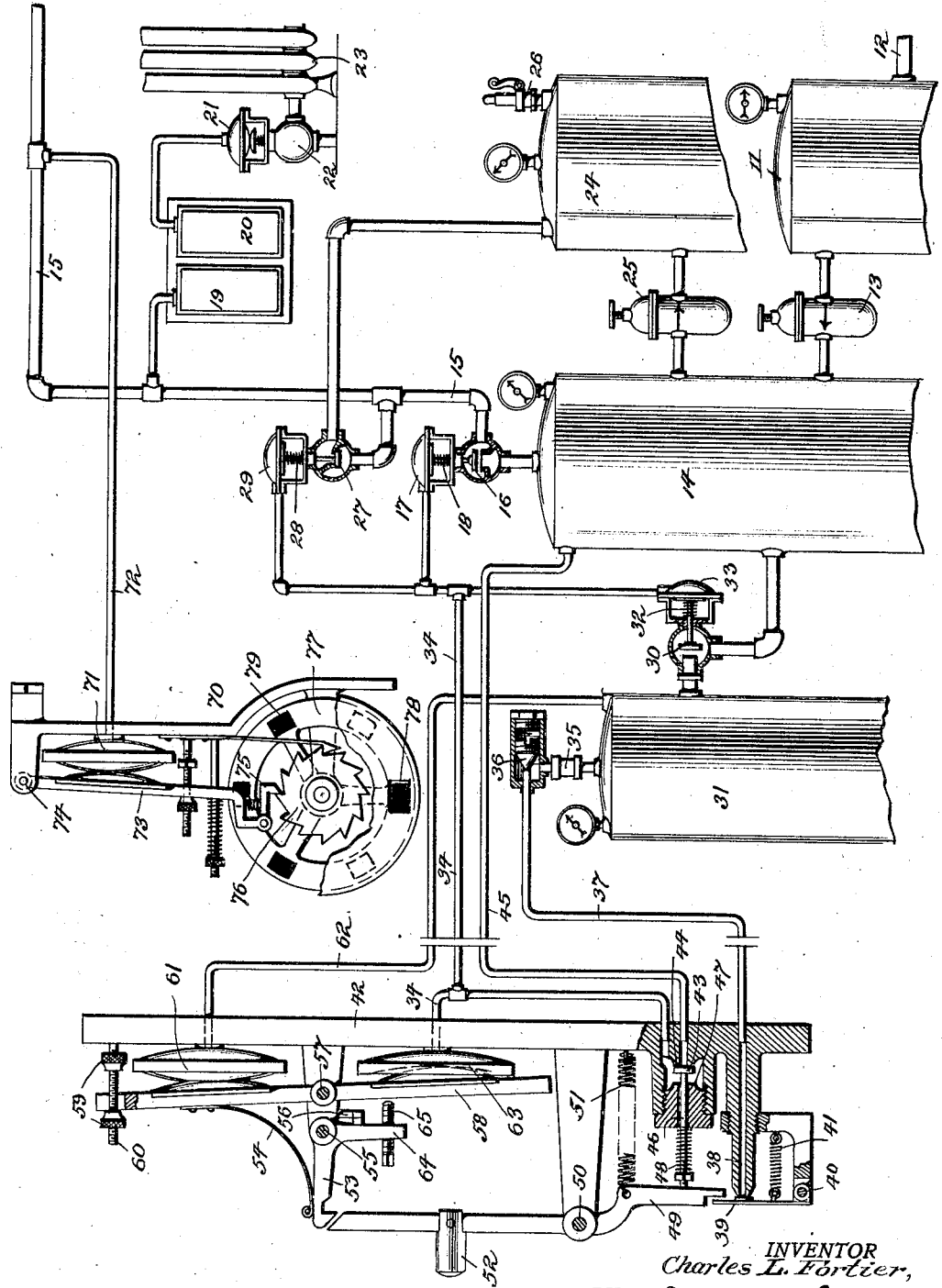
INVENTOR
Charles L. Fortier,
BY
ATTORNEYS

Patented June 26, 1928.

1,675,213

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

ACTUATING MECHANISM FOR SELECTIVE-CONTROL THERMOSTAT SYSTEMS.

Application filed July 21, 1926. Serial No. 123,894.

This invention relates to selective control thermostat systems, and particularly to mechanism for controlling the selective setting thereof.

In school houses it is known practice to install temperature regulating systems in which the thermostats are adjustable by automatic means to maintain either of two temperatures, namely, a normal day temperature and a relatively lower night temperature. Certain rooms in such buildings are commonly used at night, and therefore individual thermostats are equipped with so-called selectors which may be set to cause the thermostat to maintain day temperature in its room, while the system as a whole is biased to maintain the night temperature.

A number of different mechanisms have been proposed to change the adjustment of the thermostats as a group from a day adjustment to a night adjustment, and vice versa. One such system operates through a ratchet mechanism actuated by pressure surges in a pressure line to advance an adjusting cam step by step. This system requires as an incident to each adjustment from night to day setting and from day to night setting the reduction of air pressure in the pipe line below normal and its subsequent restoration to normal.

One problem encountered in any such adjustment is to make sure that the reduction of pressure has penetrated in the pressure line to the furthest thermostat before restoration of the pressure commences.

As each installation varies from others in number of instruments, length of piping, and similar features, it has been found difficult to design a single piece of apparatus which might be installed in any system and be capable of adjustment to meet the needs of that particular system.

The object of the present invention is to produce a simple and effective mechanism of this kind which shall be adjustable on the job to meet the particular requirements of the installation and in which the necessary adjustment is simple and readily understood.

Briefly stated, I make use of a mechanism which operates to bleed the pipe line pressure from normal to a lower pressure and maintains this lower pressure over a period of time which is predetermined and measured. The device is so contrived that when the predetermined time has elasped the mechanism will be automatically restored to its normal position and restore normal operating pressure in the line. Any suitable time measuring device may be employed.

A preferred embodiment of the invention is illustrated in the accompanying drawing, which shows the complete system, including one of the thermostatic units. The showing of the thermostatic unit is diagrammatic only.

The main reservoir is shown at 11. It is normally maintained at a pressure varying between 20 and 25 pounds by means of an ordinary pressure controlled compressor (not shown) connected to the supply pipe 12. Pressure variations in the main reservoir 11 are a necessary incident to the action of the controlling device in starting and stopping. It is desired to prevent all such variations from penetrating to the thermostat line.

Accordingly, main reservoir 11 is connected through a reducing valve 13 to the supply tank 14 which serves as the main supply of pressure fluid to the thermostat line. The thermostat line is indicated at 15 and is controlled by a valve 16, which may be closed by a bellows motor 17 against the resistance of a spring 18 when fluid pressure is admitted to the bellows motor.

Pipe 15 leads to a number of pneumatic thermostats of the pneumatic relay leak port type, one such thermostat being indicated diagrammatically at 19 with its relay 20, radiator valve motor 21, radiator valve 22 and radiator 23.

It will be understood that the thermostat 19 is equipped with some means for varying its adjustment, rendered active by a partial reduction of pressure in the line 15 followed by the restoration of this pressure to the normal value. It will be understood also that the thermostat will continue in action provided the pressure on the line 15 be reduced, but not completely vented.

For this reason the pipe 15 is not vented to atmosphere but is vented through a back pressure maintaining valve 26, connected to low pressure tank 24. The purpose of using the low pressure reservoir is to provide a supply of air sufficient to meet any outflow through the leak ports of the thermostat while the pressure on the line 15 is reduced.

The low pressure tank 24 is connected with the supply tank 14 by a pressure reducing valve 25. The valve 25 is set to feed the low pressure tank 24 whenever its pressure falls slightly below the chosen value, say 8 pounds per square inch gage. The discharge valve 26 is adjusted to open at or slightly above the chosen value, 8 pounds gage, just named.

The pipe 15 is connected with the low pressure tank 24 through a stop valve 27 which is normally held closed by pressure in the pipe 15 and by a spring 28, but may be forced open when pressure is admitted to a diaphragm motor 29. Thus if the valve 16 be closed and the valve 27 open, pressure in the pipe 15 will be gradually lowered from the 15 pounds per square inch gage characteristic of the supply tank 14 to the 8 pounds per square inch gage characteristic of the low pressure tank 24. This 7 pound reduction of pressure is sufficient to actuate the adjusting mechanism of the thermostat 19 and any further reduction would merely involve a waste of air. Pressure in the low pressure tank 24 can not fall materially below the 8 pound value, as the feed valve 25 will correct any such tendency. This feed valve will upon occasion furnish air to the line 15 through the valve 27 to supply the leak ports of the thermostats and thus keep these thermostats and their connected radiator valve motors 21 in action.

There is a connection from the supply tank 14 through a stop valve 30 to a measuring chamber 31. Stop valve 30 is normally held open by a spring 32 but may be forced closed by a bellows motor 33 when pressure is admitted thereto. Diaphragm motors 17, 29 and 33 are all connected to a single control line 34. When sufficient pressure (15 pounds gage is sufficient for this purpose) is admitted to this line the valves 16 and 30 are closed, and the valve 27 is opened.

Leading from the chamber 31 through an air filter 35 and an adjustable needle valve 36, is a connection 37 to a vent port 38. This is controlled by a flap valve 39 pivoted at 40 and normally held closed by a coil spring 41. The vent port 38 is formed on the base 42 of a control valve mechanism, and on this same base adjacent the vent port 38 is a combined admission and exhaust valve 43. When the valve 43 is to the right against the seat 44 it closes a supply connection 45 from the supply tank 14 and opens an exhaust port around the valve stem 46. When the valve 43 is to the left, against the seat 47, it opens the supply connection 45 and closes the exhaust port. The valve 43 thus acts to connect the valve chamber either to atmosphere or to the tank 14, and this valve chamber is connected to the pipe 34. Consequently, the valve 43 acts to establish either atmospheric pressure or a pressure of about 15 pounds gage in the diaphragm motors 17, 29 and 33.

The stem 46 of the valve 43 is urged outward so as to close the exhaust port and open the supply port by a spring 48 but is normally held in its opposite position by a lever 49 fulcrumed at 50 and held in its normal position by a spring 51. When the lever 49 is swung in a clockwise direction against the resistance of spring 51 it allows the valve 43 to move outward, open the supply port and close the exhaust port, and at the same time it engages the flap valve 39 and shifts it to open the vent port 38. The lever 49 may be so moved by pressing button 52, and when moved to its limit of motion is engaged by a latch 53 which is urged in engaging direction by a bow spring 54. The latch 53 is pivoted at 55 and is limited in its motion in engaging direction by a stop 56.

Pivoted at 57 adjacent the pivot 55, is a lever 58 whose motion is limited by two nuts 59 adjustable on the threaded stud 60. The lever 58 may be shifted in opposite directions by two bellows motors. Motor 61 is connected by a pipe 62 directly with the measuring chamber 31, and motor 63 is connected directly with the control line 34. An arm 64 on the latch 53 carries an adustable threaded stud 65 with which the lever 58 collides when swung in a clockwise direction.

Assuming the system is charged as described and the lever 49 in its normal position shown in the drawings, valve 27 is closed and valve 16 is opened so that the pipe 15 is under the normal pressure of 15 pounds. Valve 30 is open so that the measuring chamber 31 is charged to the normal pressure of 15 pounds. Flap valve 39 is closed to retain this pressure and valve 43 is against its right hand or inner seat, closing the supply port and opening the exhaust port. It is by this means that the motors 17, 29 and 33 which control the valves 16, 27 and 30 are positioned as above described. It is also apparent that the bellows motor 63 is deflated and the motor 61 is under the pressure of 15 pounds present in the measuring chamber 31.

To change the adjustment of the thermostat 19 the operator presses the button 52 inward until the latch 53 engages the lever 49. This immediately opens the vent 38 and starts a slow reduction of pressure in the chamber 31. At the same time, the shifting of the valve 43 operates the bellows motors 17, 29 and 33, closing the valves 16 and 30 and opening the valve 27. The effect is to terminate the supply of 15 pound air to the line 15 and connect this line to the low pressure tank so that the line 15 is vented against an 8 pound back pressure. The action of the valve 30 isolates the measuring chamber 31 from the supply tank 14.

It will be observed that under these conditions the diaphragm motor 63 is subjected to the pressure in the supply tank 14, that is, 15 pounds per square inch, and that the diaphragm motor 61 is subjected to the pressure in the measuring chamber 31, which initially is 15 pounds per square inch but which slowly falls at a rate determined by the adjustment of the needle valve 36. This adjustment is made to conform to the length of the pipe 15 and the discharging characteristics of the valve 26. The adjustment is ordinarily made by trial on the job to insure the response of the most distant thermostat.

As the pressure in the measuring chamber 31 falls the pressure in the bellows motor 61 falls likewise. Pressure in the bellows motor 63 remains constant. The effect is slowly to rotate the lever 58 until it collides with the stud 65 and disengages the latch 53, allowing spring 51 to restore the lever 49. This closes the vent port 38 and shifts the valve 43 to shut off the supply to and open the exhaust from the motors 63, 17, 29 and 33. When this occurs venting of the pipe 15 is terminated by the closing of the valve 27. Normal pressure is admitted through the valve 16. At the same time the measuring chamber 31 is recharged through the valve 30.

The apparatus indicated generally by the reference numeral 70 is an indicator mechanism to inform the operator whether the system is biased for day or night temperature. This is merely a ratchet mechanism analogous to that used in the thermostat 19 to adjust the same. It consists of a bellows motor 71 connected by a branch pipe 72 with the pipe 15. The bellows motor operates a lever 73 pivoted at 74 and carrying a pawl 75 which coacts with the ratchet wheel 76. Ratchet wheel 76 turns a disk 77 which is visible through a window 78. The disk 77 is provided with spaced indicia 79. Since the ratchet wheel is provided with twelve teeth, six indicia 79 are used, and the effect is to display alternately the black and the intervening white areas at the window 78, indicating the night and day settings of the thermostat. The indicator is not, however, a feature of the present invention and is merely illustrated in the interest of a complete disclosure.

The specific pressures suggested are illustrative only, but are those which have been successfully used in practice.

For a detailed disclosure of thermostat structures which may be adjusted by pressure surges in the manner above described, reference may be made to Patents 1,597,348 and 1,597,349, granted August 24, 1926.

What is claimed is:

1. A temperature regulating system comprising in combination a pressure line; a thermostat connected thereto and adjustable by a surge of abnormal pressure in said line; a measuring chamber; a valve mechanism shiftable to an abnormal position in which it initiates a pressure surge in said line and simultaneously initiates a progressive change of pressure in said chamber; means for restoring said valve mechanism to normal position; a latch serving to retain said valve mechanism in abnormal position; and means operable by a change of pressure in said chamber serving to release said latch.

2. A temperature regulating system comprising in combination a pressure line; a thermostat connected thereto and adjustable by a surge of abnormal pressure in said line; a measuring chamber; a valve mechanism shiftable to an abnormal position in which it initiates a pressure surge in said line and simultaneously initiates a progressive change of pressure in said chamber; means for restoring said valve mechanism to normal position; a latch serving to retain said valve mechanism in abnormal position; means operable by a change of pressure in said chamber serving to release said latch; and means associated with said pressure chamber for adjusting the time interval between the shifting of the valve and the disengagement of said latch.

3. A temperature regulating system comprising in combination a pressure line; a thermostat connected thereto and adjustable by a surge of abnormal pressure in said line; a measuring chamber; a valve mechanism shiftable to an abnormal position in which it initiates a pressure surge in said line and simultaneously initiates a progressive change of pressure in said chamber; means for restoring said valve mechanism to normal position; a latch serving to retain said valve mechanism in abnormal position; means operable by a change of pressure in said chamber serving to release said latch; and means for adjusting the time rate of pressure change in said chamber.

4. A temperature regulating system comprising in combination, a pressure line; a thermostat connected thereto and adjustable by a surge of abnormal pressure in said line; a measuring chamber normally charged with pressure fluid; a valve mechanism shiftable to an abnormal position in which it initiates a pressure surge in said line and simultaneously opens a restricted vent from said measuring chamber; means for restoring said valve mechanism to normal position; a latch serving to retain said valve mechanism in abnormal position; and means rendered active by the fall of pressure in said pressure chamber to release said latch.

5. A temperature regulating system comprising in combination, a pressure line; a thermostat connected thereto and adjustable by a surge of abnormal pressure in said line; a measuring chamber normally charged with pressure fluid; a valve mechanism shiftable to an abnormal position in which it initiates a pressure surge in said line and simultaneously opens a restricted vent from said measuring chamber; means for restoring said valve mechanism to normal position; a latch serving to retain said valve mechanism in abnormal position; means rendered active by the fall of pressure in said pressure chamber to release said latch; and means associated with said measuring chamber for adjusting the time interval between the shifting of the valve and the disengagement of said latch.

6. A temperature regulating system comprising in combination, a pressure line; a thermostat connected thereto and adjustable by a surge of abnormal pressure in said line; a measuring chamber normally charged with pressure fluid; a valve mechanism shiftable to an abnormal position in which it initiates a pressure surge in said line and simultaneously opens a restricted vent from said measuring chamber; means for restoring said valve mechanism to normal position, a latch serving to retain said valve mechanism in abnormal position; means rendered active by the fall of pressure in said pressure chamber to release said latch; and means for varying the effective area of said vent.

7. A temperature regulating system comprising in combination a pressure line; a thermostat connected thereto and adjustable by a surge of abnormal pressure therein; a main tank; means for maintaining a substantially constant pressure therein; an auxiliary tank; a loaded vent valve connected to discharge pressure fluid from said auxiliary tank when the pressure therein exceeds a value materially lower than that in the main tank; a pressure reducing feed valve arranged to maintain in said auxiliary tank a pressure slightly lower than that at which said vent valve opens; and valve means for connecting said line alternatively with said tanks.

8. A temperature regulating system comprising in combination a pressure line; a thermostat connected thereto and adjustable by a surge of abnormal pressure therein; a main tank; means for maintaining a substantially constant pressure therein; an auxiliary tank; a loaded vent valve connected to discharge pressure fluid from said auxiliary tank when the pressure therein exceeds a value materially lower than that in the main tank; a pressure reducing feed valve interposed between said tanks and arranged to maintain in said auxiliary tank a pressure slightly lower than that at which said vent valve opens; and valve means for connecting said line alternatively with said tanks.

9. In a temperature regulating system the combination of a pressure line; a thermostat connected thereto and adjustable by a surge of abnormal pressure therein; a high pressure reservoir normally connected with said line; a low pressure reservoir normally disconnected from said line; a measuring chamber having a normally open feed connection; motor actuated valve means for simultaneously disconnecting said line from said high pressure reservoir and connecting it with said low pressure reservoir, and closing said feed connection to said measuring chamber; a valve mechanism shiftable to an abnormal position in which it operates said motor actuated valve means and opens a restricted vent from said measuring chamber; means for restoring said valve mechanism to normal position; a latch serving to retain said valve mechanism in abnormal position; and means rendered active by the fall of pressure in said pressure chamber to release said latch.

10. In a temperature regulating system the combination of a pressure line; a thermostat connected thereto and adjustable by a surge of abnormal pressure therein; a high pressure reservoir normally connected with said line; a low pressure reservoir normally disconnected from said line; a loaded vent valve on said low pressure reservoir; a measuring chamber having a normally open feed connection; motor actuated valve means for simultaneously disconnecting said line from said high pressure reservoir and connecting it with said low pressure reservoir, and closing said feed connection to said measuring chamber; a valve mechanism shiftable to an abnormal position in which it operates said motor actuated valve means and opens a restricted vent from said measuring chamber; means for restoring said valve mechanism to normal position; a latch serving to retain said valve mechanism in abnormal position; and means rendered active by the fall of pressure in said pressure chamber to release said latch.

11. In a temperature regulating system the combination of a pressure line; a thermostat connected thereto and adjustable by a surge of abnormal pressure therein; a high pressure reservoir normally connected with said line; a low pressure reservoir normally disconnected from said line; a measuring chamber having a normally open feed connection; motor actuated valve means for simultaneously disconnecting said line from said high pressure reservoir and connecting it with said low pressure reservoir and closing said feed connection to said measuring chamber; a valve mechanism shiftable to an abnormal position in which it operates said motor actuated valve means and opens a restricted vent from said measuring chamber; means for restoring said valve mechanism to normal position; a latch serving to retain said valve mechanism in abnormal position; means rendered active by the fall of pressure in said pressure chamber to release said latch; and means for varying the effective area of said vent.

12. In a temperature regulating system the combination of a pressure line; a thermostat connected thereto and adjustable by a surge of abnormal pressure therein; a high pressure reservoir normally connected with said line; a low pressure reservoir normally disconnected from said line; a measuring chamber having a normally open feed connection; motor actuated valve means for simultaneously disconnecting said line from said high pressure reservoir and connecting it with said low pressure reservoir and closing said feed connection to said measuring chamber; a valve mechanism shiftable to an abnormal position in which it operates said motor actuated valve means and opens a restricted vent from said measuring chamber; means for restoring said valve mechanism to normal position; a latch serving to retain said valve mechanism in abnormal position; means tending to disengage said latch; and a motor energized by measuring chamber pressure resisting the action of said disengaging means.

13. In a temperature regulating system the combination of a pressure line; a thermostat connected thereto and adjustable by a surge of abnormal pressure therein; a high pressure reservoir normally connected with said line; a low pressure reservoir normally disconnected from said line; a measuring chamber having a normally open feed connection; motor actuated valve means for simultaneously disconnecting said line from said high pressure reservoir and connecting it with said low pressure reservoir, and closing said feed connection to said measuring chamber; a valve mechanism shiftable to an abnormal position in which it operates said motor actuated valve means and opens a restricted vent from said measuring chamber; means for restoring said valve mechanism to normal position; a latch serving to retain said valve mechanism in abnormal position; a member movable to disengage said latch; a motor device energized by said valve mechanism concurrently with said motor actuated valve means, tending to move said member in latch-disengaging direction; and an opposing motor device connected with said measuring chamber.

14. A temperature regulating system comprising in combination a pressure line; a thermostat connected thereto and adjustable by a surge of abnormal pressure in said line; a valve mechanism shiftable to an abnormal position in which it establishes an abnormal pressure in said line; means for restoring said valve mechanism to normal position; and means arranged to be put into action by the movement of said valve mechanism to abnormal position and serving to cause said restoring means to act after a definite time interval.

15. The combination with a temperature regulating system, comprising a pressure line, control valves and thermostats adjustable by a surge of abnormal pressure in said line, of an adjustable valve device operable to establish and maintain an abnormal pressure in said line over a predetermined time interval, and then restore normal pressure in said line.

In testimony whereof I have signed my name to this specification.

CHARLES L. FORTIER.